United States Patent [19]

Kramer

[11] 4,424,946
[45] Jan. 10, 1984

[54] LIGHTWEIGHT AIRCRAFT

[76] Inventor: Dale C. Kramer, 300 Steele St., Port Colborne, Ontario, Canada, L3K 4X8

[21] Appl. No.: 203,899

[22] Filed: Nov. 4, 1980

[51] Int. Cl.$^3$ ............................................. B64C 19/02
[52] U.S. Cl. ...................... 244/13; 244/225; 244/90 R; 244/DIG. 1; 244/237
[58] Field of Search ............. 244/DIG. 1.1, DIG. 1.2, 244/DIG. 1.3, DIG. 1.4, DIG. 1.5, 12.3, 16, 87 R, 225, 232, 237

[56] References Cited

U.S. PATENT DOCUMENTS

| | | | |
|---|---|---|---|
| 1,011,139 | 12/1911 | Adams | 244/45 R |
| 1,886,932 | 11/1932 | Andersson | 244/225 |
| 3,083,933 | 4/1963 | Cella | 244/DIG. 1.3 |
| 4,025,007 | 5/1977 | Kaniut | 244/87 |

FOREIGN PATENT DOCUMENTS

| | | | |
|---|---|---|---|
| 985498 | 7/1951 | France | 244/87 |
| 379554 | 9/1932 | United Kingdom | 244/87 |

OTHER PUBLICATIONS

Popular Mechanics, Ultralights, Bill Allen, Mar. 1979.
Jane's All the World's Aircraft 1977–1978, pp. 612, 613.
Hang Gliding, Daniel Poynter, p. 190.

*Primary Examiner*—Galen L. Barefoot
*Attorney, Agent, or Firm*—Sim & McBurney

[57] ABSTRACT

An ultralight aircraft has a single stick three-axis aerodynamic control, twin engined power control, wing- and tail-mounted ailerons, an inverted V-tail and wide span wings with upturned tips.

10 Claims, 6 Drawing Figures

LIGHTWEIGHT AIRCRAFT

FIELD OF INVENTION

The present invention relates to lightweight aircraft.

BACKGROUND TO THE INVENTION

There is a considerable current interest in flying for pleasure with little or no regulation and flexibility of take-off and landing areas. This interest has led to the popularity of hang gliding and powered hang gliders. There is a need for a powered ultralight aircraft which has many of the attributes of hang gliding but without its inherent dangers.

SUMMARY OF INVENTION

In accordance with the present invention, there is provided an ultralight aircraft having a rigid wing, three-axis aerodynamic control and twin-engined power. The aircraft includes an inverted V-tail, upswept wing tips and a single stick control for the three axes.

DESCRIPTION OF PREFERRED EMBODIMENT

Figure 1:
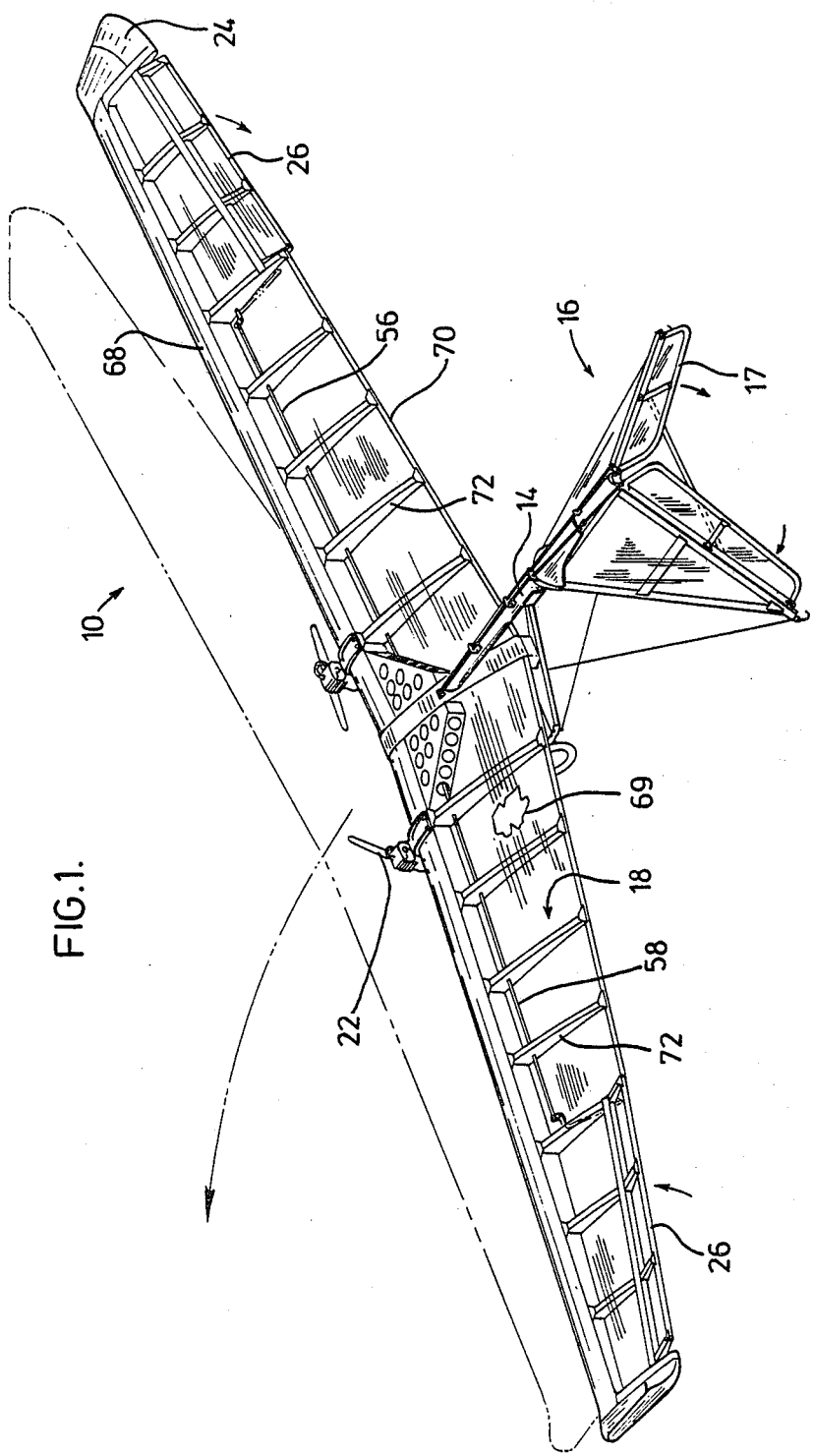
FIG. 1 is perspective view, from above, of an aircraft constructed in accordance with one embodiment of the invention.
Figure 2:
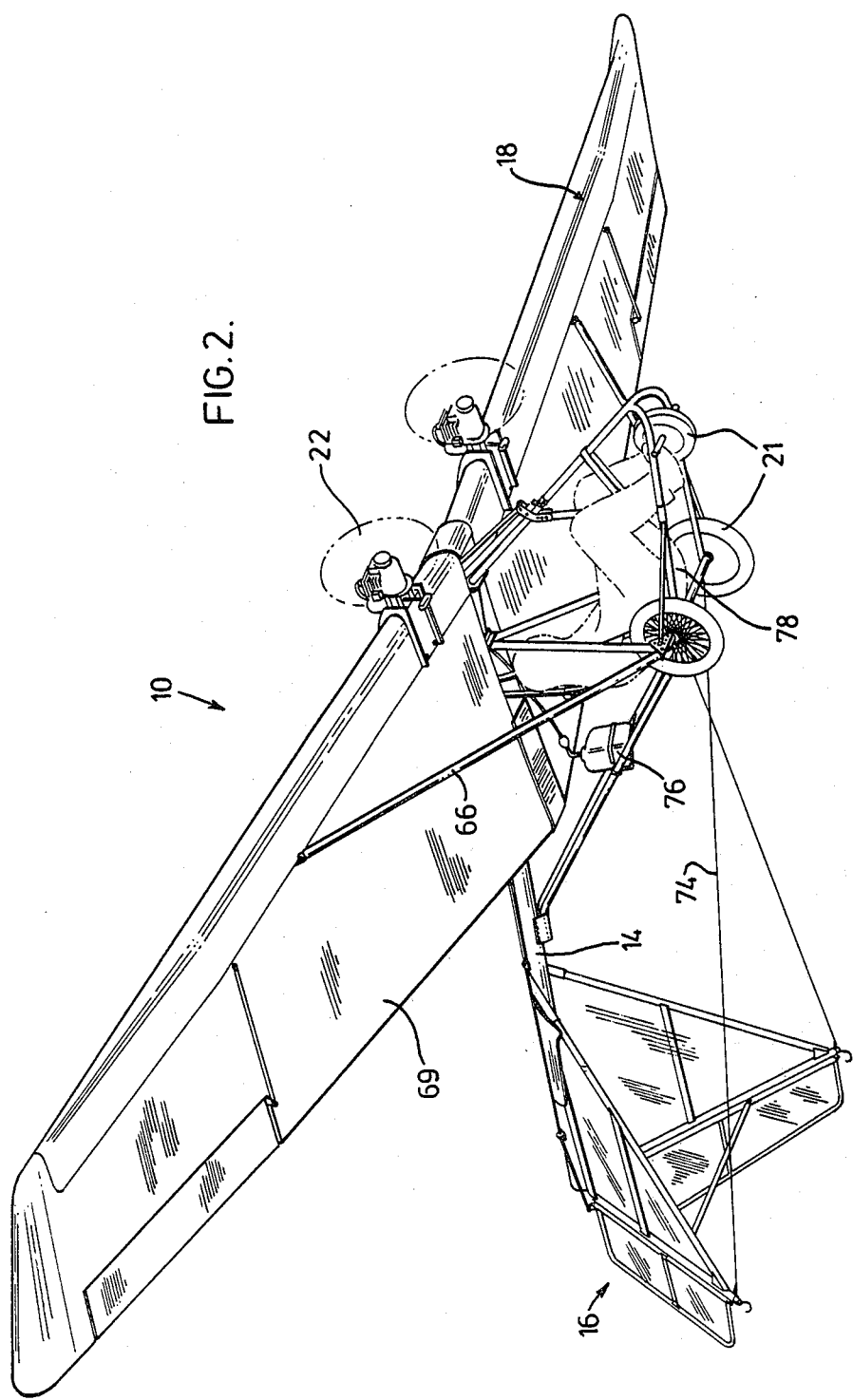
FIG. 2 is a perspective view, from below, of the aircraft of FIG. 1.
Figure 3:
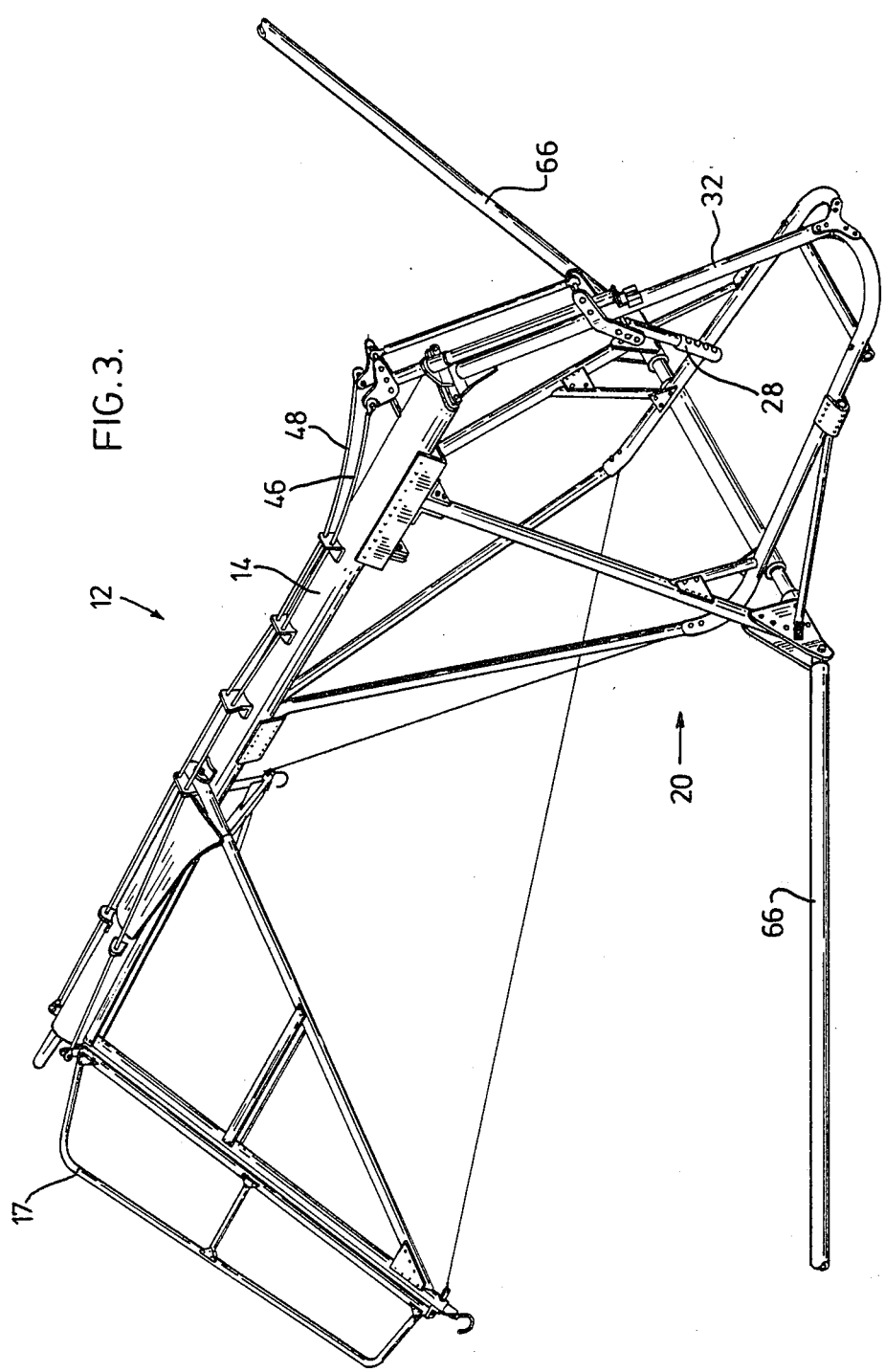
FIG. 3 is a perspective view of the fuselage frame of the aircraft of FIG. 1.

Referring to the drawings, there is shown therein an ultralight aircraft 10 constructed in accordance with a preferred embodiment of the invention. The aircraft 10 has a central fuselage 12 which includes tubular backbone rod 14 to which is attached at the rear end thereof an inverted V-tail assembly 16 which includes control surfaces 17 and at the forward end thereof a pair of dihedrally-arranged wing assemblies 18. The aircraft 10 has a large wing span to axial length ratio so as to diminish tail weight requirements and increase the overall tail strength, as a result of decreased cantilever distances. A pilot support structure or cockpit 20 depends from the tubular rod 14 adjacent the forward end thereof and extends below the wing assemblies 18. Landing wheels 21 are mounted to the cockpit structure 18.

Twin engine driven propellers 22 are mounted to the forward edge of the wing assemblies 18 which have upturned tips 24 and ailerons 26 at the rearward edge thereof. Control of the ailerons 26 and control surfaces 17, and thereby pitch, yaw and roll movements of the aircraft 10, is effected using a single two-axis-movable control stick or lever 28, which is positioned to be manipulated by the pilot when seated in the cockpit structure 20.

Figure 4:
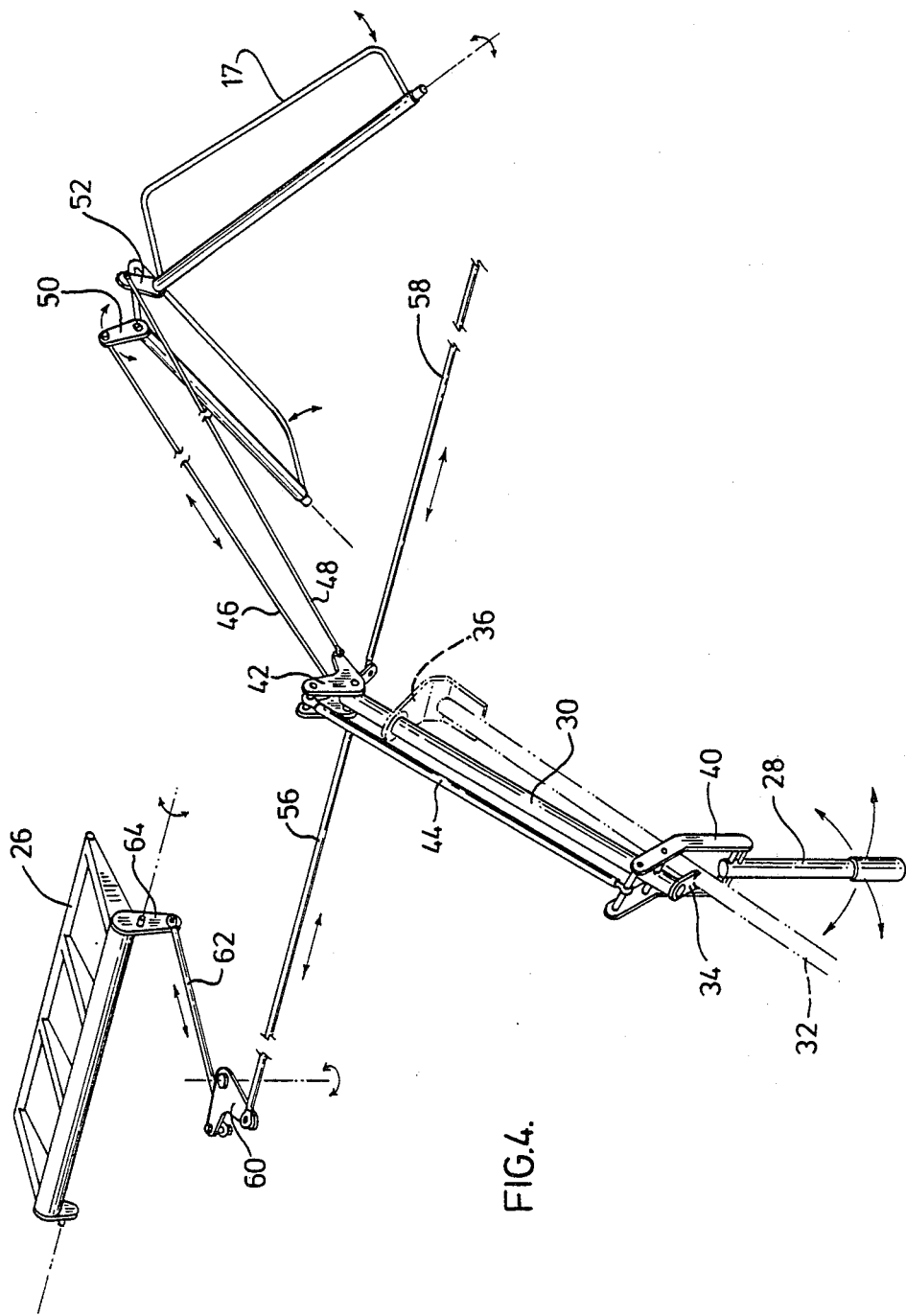
FIG. 4 is a perspective view of the aerodynamic control system of the aircraft of FIG. 1.
Figure 5:
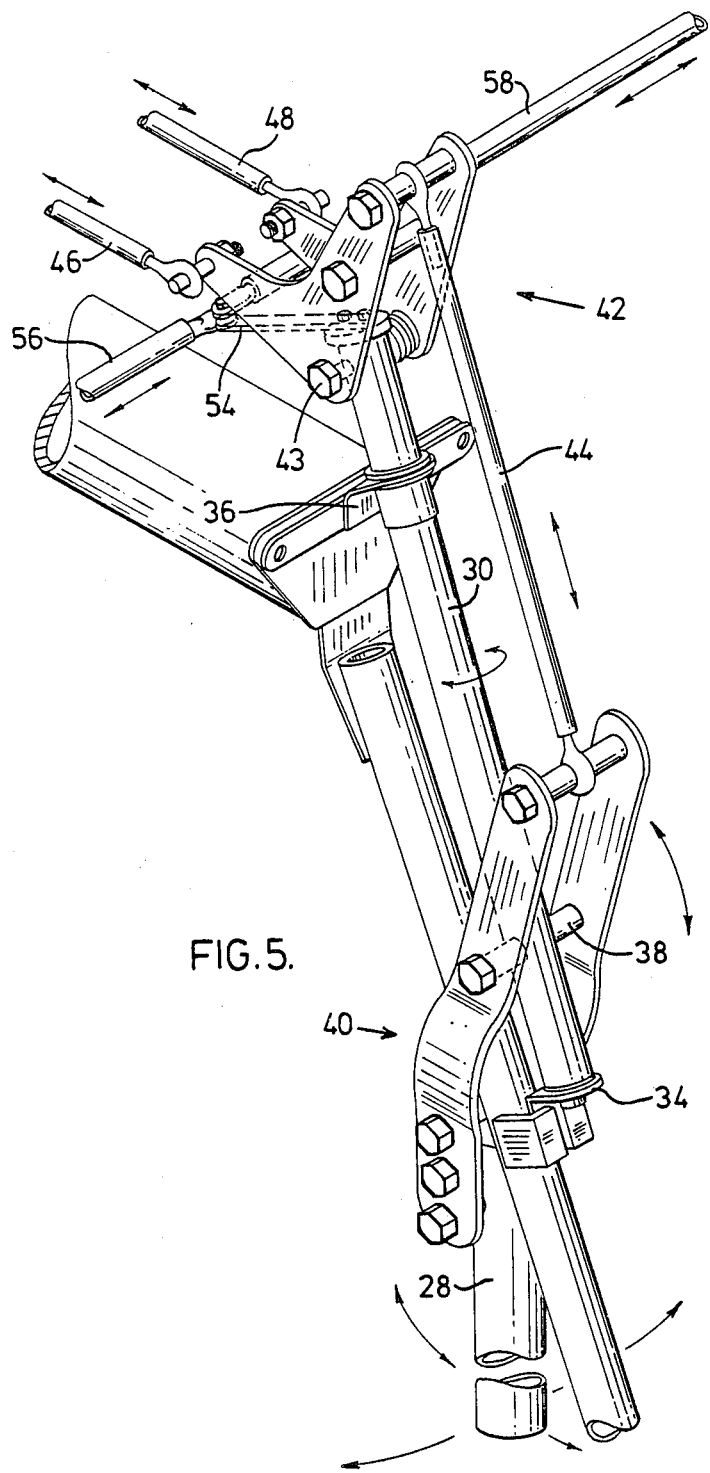
FIG. 5 is a close up detail view of the mixer for the control system of FIG. 4.
Figure 6:
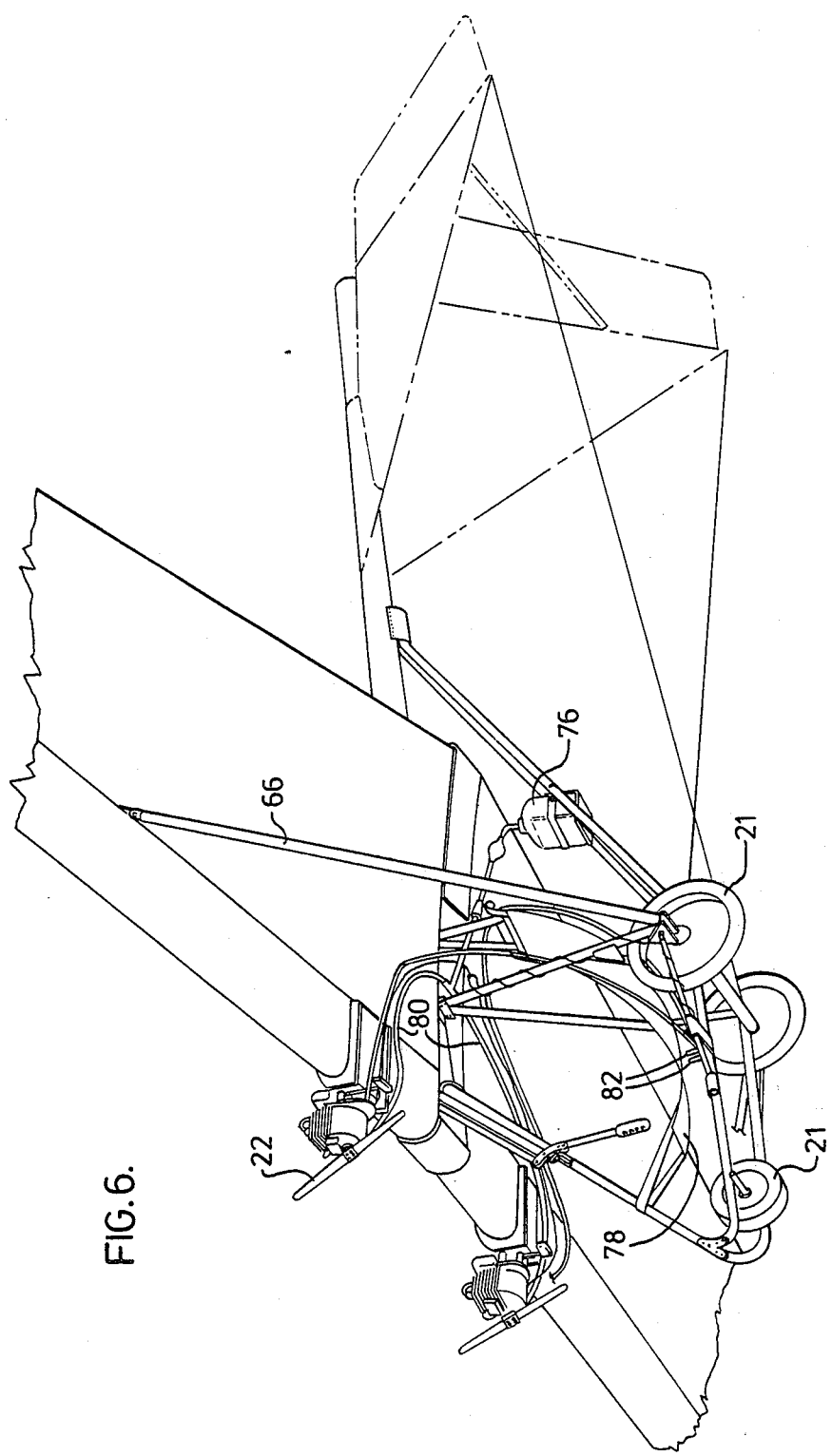
FIG. 6 is a perspective view from below of the aircraft of FIG. 1, illustrating the power control system of the aircraft of FIG. 1.

The aerodynamic control system is shown in detail in FIGS. 4 and 5. A mounting rod 30 is rotatably supported on a strut 32 of the pilot support structure 20 by a pivot mounting 34 and a journal mounting 36 through which the mounting rod 30 projects.

A pivot pin 38 extends through the mounting rod 30 transverse to the axis thereof adjacent the pivot mounting 34 and has the arms of a yoke 40 mounted thereto for pivoting movement of the yoke 40 relative to the mounting rod 30. The lower end of the yoke 40 is fixedly mounted to the control lever 28 whereby forward and rearward motion of the control lever 28 causes pivoting of the yoke 40 relative to the mounting rod 30 while side-to-side motion of the control rod 28 causes rotation of the mounting rod 30 about its axis.

A bell crank shaped yoke 42 is pivotally mounted to the mounting rod 30 at its upper end by pivot pin 43 and is connected to the first yoke 40 by a tie rod 44 whereby pivotal movement of the yoke 40 about pivot pin 38 causes a corresponding pivotal movement of yoke 42 about pivot pin 43. The yoke 42 is connected to the tail ailerons 17 by connecting rods 46 and 48 and cranks arms 50 and 52. The crank arms 50 and 52 are respectively rigidly mounted to the two rear ailerons 17, which, in turn, are mounted for axial rotation.

A connecting bar 54 is rigidly connected to the upper end of the mounting rod 30 and extends between the arms of the upper yoke 42. The remote end of the connecting bar 54 is pivotally connected to the joined ends of control rods 56 and 58 which extend within the wings 18 to bell cranks 60 pivotally mounted for movement about a vertical axis. For simplicity of illustration, the aileron 26 and its interconnection on one side of the wing 18 only are illustrated in FIG. 4 but it will be understood that there is an equivalent structure for the other side of the wing 18. The bell crank 60 is connected to the aileron 26 by a connecting rod 62 and crank arm 64.

It will be apparent from this description that a rearward motion of the control lever 28 causes simultaneous upward movement of the rear control surfaces 17 to cause the aircraft 10 to rise for take-off or in flight while forward movement of the control lever 28 causes simultaneous downward movement of the rear control surfaces 17 to cause the aircraft 10 to fall in flight. Thus, forward and rearward motion of the control lever 28 controls the aircraft pitch. The wing ailerons 26 do not move during such motions.

A movement of the control lever 28 to one side causes one wing aileron 26 and the corresponding tail control surfaces 17 to pivot upwardly while the other wing aileron 26 and its corresponding tail control surfaces 17 pivots downwardly to cause the aircraft to turn in the direction of movement of the control lever 28. Thus, side-to-side motion of the control lever 28 controls both the yaw and roll of the aircraft simultaneously.

The single control lever 28, therefore, controls pitch, yaw and roll motions of the aircraft 10 by movement in two axial directions only. Full three axis aerodynamic control is exercised by the control surfaces 17 and ailerons 26 and no weight shift is involved in controlling the aircraft 10.

The wings 18 are mounted directly to the fuselage 12 and are supported from below by struts 66 which extend from the cockpit structure 20. The wings 18 include a curved enclosed D-cell front edge 68 to which the engines 22 are mounted and airfoil-shaped surfaces formed of any convenient covering material 69 extending therefrom and terminating in a rearward edge 70. The surface covering material 69 may be opaque but usually is transparent to improve pilot visibility, such as, Mylar film. Support walls 72 constructed of any convenient material, extend between the forward and rearward edges 68 and 70 and are shaped to correspond to the airfoil shape.

The upswept curved wing tips 24 increase aircraft stability, i.e. the ability of the aircraft 10 to return to its flight pattern when disturbed therefrom, and increase aileron effectiveness as a result of smoothing out air flow over the tip of the respective aileron 26. The mounting of the engines 22 on the forward edge 70 of the wings 18 creates induced lift which decreases stall speed and increases climb rate. In addition, two separate engines 22 avoid the problems of a single engine, which needs to be positioned either in front of the pilot, which leads to discomfort for the pilot from the airflow, or behind him, which often leads to overheating problems.

An inverted V-tail 16 is an aerodynamically efficient tail design and combines the effect of the horizontal and vertical tail portions of conventional aircraft but with much less combined surface area, and hence less drag. Problems of an inverted V-tail which may be associated with ground obstructions and rotation for slow take-offs and landings are overcome by cable-bracing each tail tip to the cockpit structure 20 by cables 74 and by setting the wing-to-boom incidence, i.e. the angle between the wings 18 and the tubular backbone member 14, at a mildly-acute angle, such as, 10 degrees. This structure, combined with the three wheels 21 imparts a tail dragger effect to the aircraft 10.

A fuel tank 76 is located behind the pilot who sits in a seat 78 mounted to the cockpit structure 20. Fuel lines 80 connect the fuel tank 76 to the engines 22. The engines 22 are independently controlled by throttle levers 82.

The aircraft 10, which combines a wide wing span, inverted V-tail, three axis single stick aerodynamic control, and twin engines, may be constructed of lightweight but strong materials, such as, aluminum, to permit an ultralightweight aircraft to be provided. For example, an aircraft weighing just 140 lbs. may be provided with dimensions of wing span 36 ft. 4 in., length 14 ft., height 6 ft. 4 in., wing area 142 sq. ft. and aspect ratio 9.3:1. Such an aircraft can cruise at 40 mph using two 6 h.p. two-cycle engines.

SUMMARY OF DISCLOSURE

In summary of this disclosure, the present invention provides an ultralight aircraft of superior design. Modifications are possible within the scope of the invention.

What I claim is:

1. An aircraft, comprising:
   axially-extending fuselage means,
   pilot cockpit means depending from said fuselage means adjacent a forward end thereof,
   air foil-shaped wing means mounted to said fuselage means adjacent said forward end thereof and extending one on each side of said fuselage means transverse to said fuselage means,
   each said wing means having aileron means mounted to a rear edge thereof for pivotal movement relative thereto,
   tail means mounted to a rearward end of said fuselage means, said tail means being inverted V-tail means consisting of a pair of tail members defining an inverted V-shape when viewed along the aircraft axis and each depending from the fuselage means at an acute angle thereto,
   each said V-tail member having control surface means mounted to a rear edge thereof for pivotal movement relative thereto, and
   single control lever means located in said cockpit means and operably connected to said wing-mounted aileron means and to said tail-mounted control surface means for effecting pivotal movement, in the same direction, of said tail-mounted control surface means only while said wing-mounted aileron means remain stationary to achieve pitch motion of said aircraft upon movement of said control lever means axially of the aircraft and for effecting simultaneous pivotal movement, in one direction, of one of said wing-mounted aileron means and the tail-mounted control surface means on the same side of the fuselage and simultaneous pivotal movement, in the opposite direction, of the other of said wing-mounted aileron means and the other of said tail-mounted control surface means to achieve simultaneous yaw and roll motions of said aircraft upon movement of said control lever means transversely to the axis of the aircraft.

2. The aircraft of claim 1, wherein said wing means each has an outwardly and upwardly curved wing tip.

3. The aircraft of claim 1 or 2 wherein said wing means each has a motor driven propeller mounted thereon.

4. The aircraft of claim 3 wherein said wing means each is mounted at a mildly upwardly acute angle to said fuselage means.

5. The aircraft of claim 1, wherein said operable connection between said single control lever means and said wing-mounted aileron means and said tail-mounted control surface means comprises motion mixing means actuated by said control lever, first connecting means extending between said tail-mounted control surface means and said motion mixing means, and second connecting means extending between said wing-mounted aileron means and said motion mixing means.

6. The aircraft of claim 1 wherein said operable connection between said single control lever means and said wing-mounted aileron means and said tail-mounted control surface means comprises a pivotal mounting from which said control lever means depends and about which the lever means may move axially of the aircraft, said pivotal mounting including a yoke having a pair of generally parallel upwardly-directed side arms which are rigidly mounted to an upper end of said lever means and a pivot pin extending horizontally transverse to the longitudinal axis of the aircraft and between the yoke arms at a location part-way along the length thereof, said pivot pin passes through a tubular rod extending axially of the aircraft adjacent one end thereof, said tubular rod is mounted to said fuselage means for rotational movement about its axis, whereby movement of said lever means transverse to the axis of the aircraft causes rotation of said tubular rod about its axis, and connection means located at the opposite end of said tubular rod from said pivot pin establishing operable connection to said wing-mounted aileron means and to said tail-mounted control surface means.

7. An aircraft aerodynamic control system, comprising:
   first wing-mounted aileron means mounted on a rear edge of a first wing of said aircraft extending on one side of the aircraft axis for pivotal movement about the wing axis, second wing-mounted aileron means mounted on a rear edge of a second wing of said aircraft extending on the opposite side of the aircraft axis from said first wing for pivotal movement about the wing axis, first tail-mounted control surface means mounted on a rear edge of a first tail member depending downwardly on one side of the aircraft axis at an acute angle thereto for pivotal movement about the first tail member axis, second tail-mounted control surface means mounted on a rear edge of a second tail member depending downwardly on the opposite side of the aircraft axis from said first tail member at an acute angle thereto to define a substantial inverted V-shape with said first tail member when viewed along the aircraft axis, said second tail mounted control surface means being mounted for pivotal movement about the second tail member axis, single control lever means operably connected to said first and second wing-mounted aileron means and to said first and second tail-mounted control surface means to effect three axis aerodynamic motion of said aircraft by two axis movement of said lever means, said control lever means depending from a pivotal mounting about which the lever means may move axially of the aircraft, said pivotal mounting including a yoke having a pair of generally parallel upwardly-directed side arms which are rigidly mounted to an upper end of said control lever means and a first pivot pin extending horizontally transverse to the longitudinal axis of the aircraft and between the yoke arms at a location part-way along the length thereof, said pivot pin passing through a tubular rod extending axially of the aircraft adjacent one end thereof, said tubular rod being mounted for rotational movement about its axis whereby movement of the lever means transverse to the axis of the aircraft causes rotation of said tubular rod about its axis, second yoke means comprising a pair of bell-crank shaped arms and a second pivot pin extending parallel to said first pivot pin between said arms at the bend therein, said second yoke means being connected from one end of the arm thereof to the upper end of the first yoke arms, and from the other end of the arms thereof to the tail-mounted control surface means, and connecting bar means rigidly mounted at one end thereof to said opposite end of said tubular rod, said connecting bar means being connected from the other end thereof to the wing-mounted ailerons, whereby, pivotal movement of said first yoke means about said first pivot pin causes pivotal movement of said second yoke means about said second pivot pin, thereby causing simultaneous movement of said tail-mounted control surface means in the same direction while said wing-mounted ailerons remain stationary to achieve pitch motion of said aircraft, and rotational movement of said tubular rod causes rotational movement of said second yoke means and sideways movement of said connecting bar means, thereby causing simultaneous movement of one said wing-mounted aileron means and the tail-mounted control surface means on the same side of the axis of the aircraft in one direction and simultaneous movement of the other of the wing-mounted aileron means and the other tail-mounted control surface means in the opposite direction to achieve simultaneous yaw and roll motions of said aircraft.

8. The control system of claim 7 wherein connection between said other end of said arms of said second yoke means and each of said tail-mounted control surface means comprises a rigid connecting rod extending from one of said arm ends towards said tail-mounted control surface means and a crank arm rigidly mounted one at one end thereof to a tail-mounted control surface means and at the other end thereof to said connecting rod, and connection between said connecting bar means and each of said wing-mounted aileron means comprises a first rigid connecting rod extending from said other end of said connecting bar means transverse to the longitudinal axis of the aircraft to one end of a bell crank arm mounted for pivotal movement about a vertical axis, a second rigid connecting rod extending from the other end of said bell crank arm parallel to the longitudinal axis of the aircraft towards the wing-mounted aileron means and a crank arm rigidly connected at one end thereof to a wing-mounted aileron means and at the other end thereof to said second connecting rod.

9. An aircraft, comprising:

axially-extending fuselage means, pilot cockpit means depending from said fuselage means adjacent a forward end thereof, airfoil-shaped wing means mounted to said fuselage means adjacent said forward end thereof and extending one on each side of said fuselage means transverse to said fuselage means, each said wing means having aileron means mounted to a rear edge thereof for pivotal movement relative thereto, tail means mounted to a rearward end of said fuselage means, said tail means being inverted V-tail means consisting of a pair of tail members defining an inverted V-shape when viewed along the aircraft axis and each depending from the fuselage means at an acute angle thereto, each said V-tail member having control surface means mounted to a rear edge thereof for pivotal movement relative thereto, and control means operably connected to said wing-mounted aileron means and to said tail-mounted control surface means for imparting pitch, yaw and roll motions to said aircraft by effecting pivotal movement, in the same direction, of said tail-mounted control surface means while said wing-mounted aileron means remain stationary to achieve said pitch motion, by effecting pivotal movement of one of said wing-mounted aileron means in one direction and pivotal movement of the other of said wing-mounted aileron means in the other direction to achieve said roll motion, and by effecting pivotal movement of one of said tail-mounted control surface means in one direction and pivotal movement of the other of said tail-mounted control surface means in the other direction to achieve simultaneously said yaw motion and said roll motion.

10. The aircraft of claim 9 wherein said yaw and roll motions are achieved simultaneously by simultaneous pivotal movement, in one direction, of one of the wing-mounted aileron means and the tail-mounted control surface means on the same side of the fuselage and simultaneous pivotal movement, in the opposite direction, of the other of the wing-mounted aileron means and the other of said tail-mounted control surface means.

* * * * *